United States Patent [19]
Saxholm

[11] 3,975,716
[45] Aug. 17, 1976

[54] ARRANGEMENT IN CONNECTION WITH A PRINTER WITH KEYBOARD FOR PRINTING DATA IN PLAIN LANGUAGE AND SIMULTANEOUSLY RECORDING CORRESPONDING CODED DATA

[76] Inventor: Rolf Saxholm, Aastadveien 2, Billingstad, Norway, 1362

[22] Filed: May 15, 1974

[21] Appl. No.: 470,316

Related U.S. Application Data

[63] Continuation-in-part of Ser. No. 282,941, Aug. 23, 1972, abandoned, which is a continuation-in-part of Ser. No. 53,794, July 10, 1970, abandoned.

[30] Foreign Application Priority Data

July 11, 1969  Norway............................ 2912/69

[52] U.S. Cl. ............................................. 340/172.5
[51] Int. Cl.² ....................... B41J 5/36; G06F 1/00
[58] Field of Search.................... 340/172.5; 197/20

[56] References Cited
UNITED STATES PATENTS

| | | | |
|---|---|---|---|
| 3,353,744 | 11/1967 | Becking et al. ................. | 197/20 X |
| 3,376,554 | 4/1968 | Kotok et al. ................... | 340/172.5 |
| 3,411,141 | 11/1968 | Bernier et al. .................. | 340/172.5 |
| 3,501,747 | 3/1970 | Bungard et al. ................ | 340/172.5 |
| 3,516,068 | 6/1970 | Howard et al. ................. | 340/172.5 |
| 3,566,365 | 2/1971 | Rawson et al. ................. | 340/172.5 |
| 3,573,739 | 4/1969 | Zertlin .......................... | 340/172.5 |

*Primary Examiner*—Raulfe B. Zache
*Attorney, Agent, or Firm*—Watson, Cole, Grindle & Watson

[57] ABSTRACT

In a data identification and information system a writer unit prints plain language alpha/numeric data on at least one recording medium within the writer unit in response to internal or external data signals, and generates coded output signals. A first record forming device responsive to the coded output signals duplicates the plain language alpha/numeric data. A reader actuates the writer unit to print plain language alpha/numeric data in accordance with coded recorded information stored on a recording medium, and actuates the first record forming device for duplication of the reader output coded information. A data storage means temporarily stores coded signals representative of the specified identification data printed by the writer unit. The first record forming means is responsive to the coded output signals and duplicates in coded form the plain language alpha/numeric data printed by the writer unit. A second record forming device records the coded signals stored in the data storage means onto at least one recording medium containing the plain language alpha/numeric data previously printed thereon by the writer unit. A control circuit controls the respective transfer of the coded signals between the writer unit and the storage means and between the storage means and the second record forming device.

7 Claims, 7 Drawing Figures

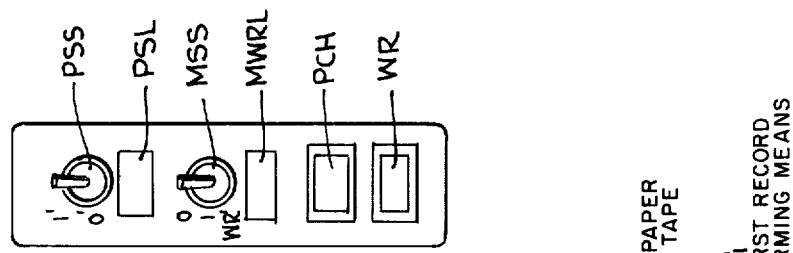
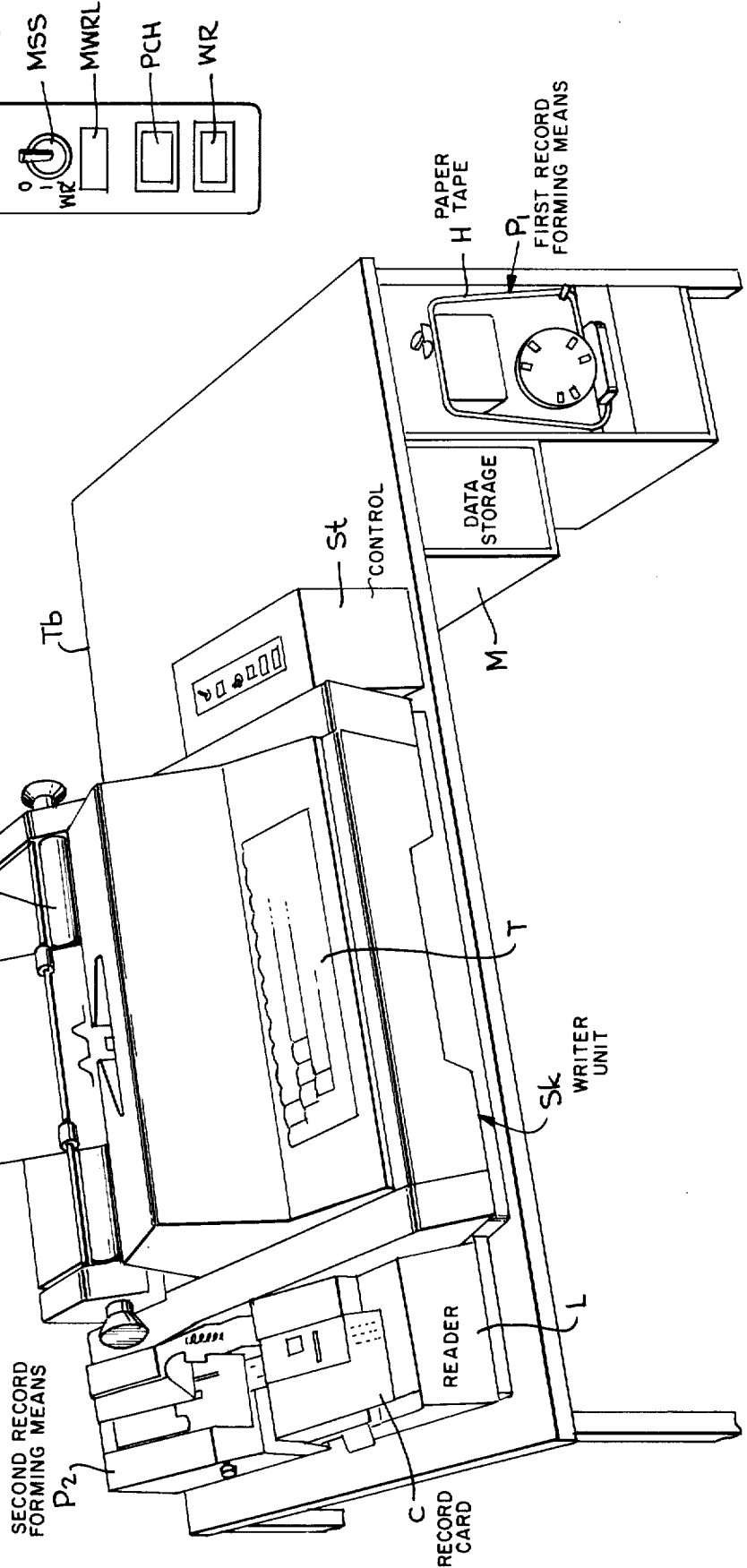

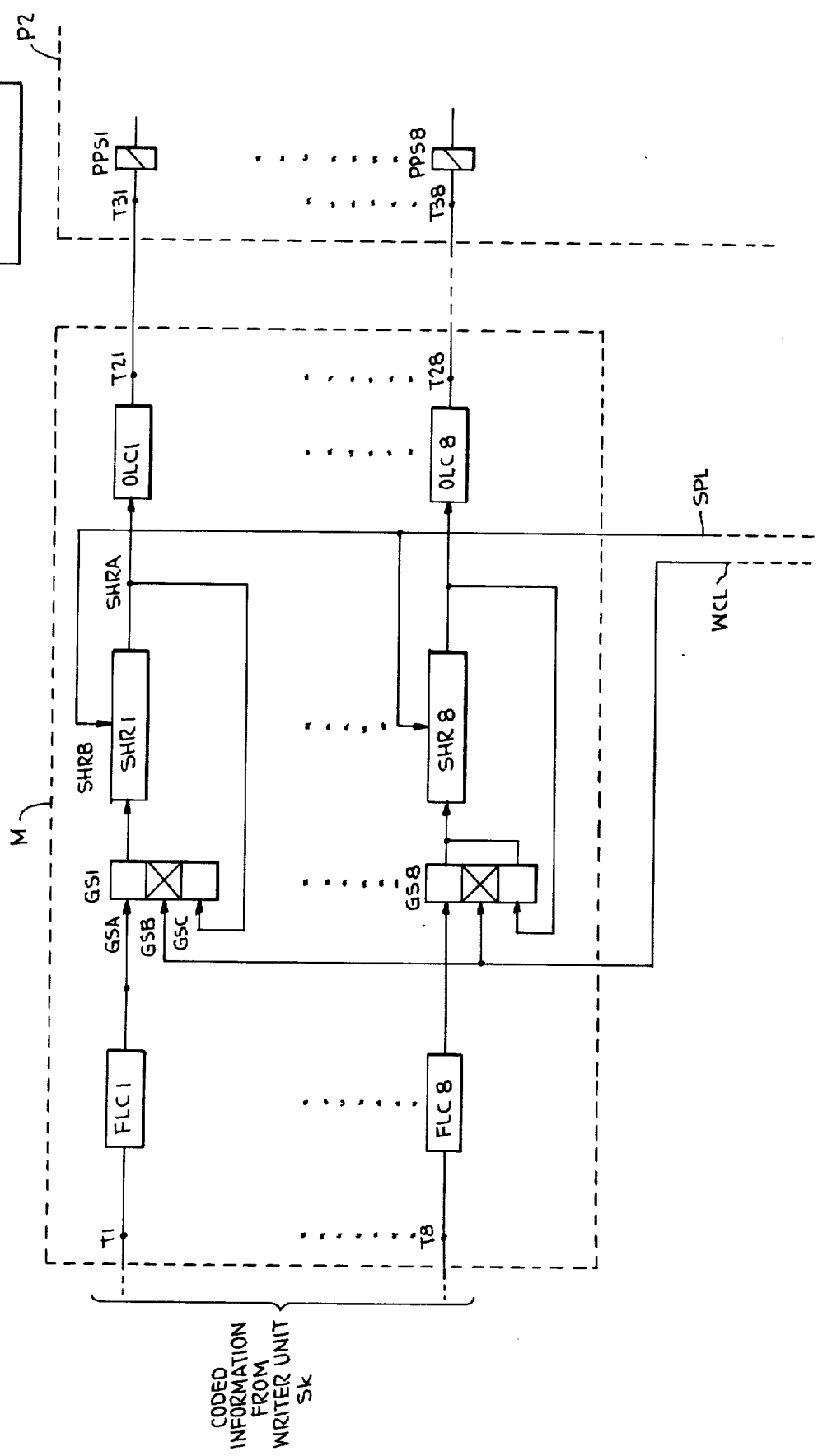

ARRANGEMENT IN CONNECTION WITH A PRINTER WITH KEYBOARD FOR PRINTING DATA IN PLAIN LANGUAGE AND SIMULTANEOUSLY RECORDING CORRESPONDING CODED DATA

CROSS RELATED APPLICATION

This application is a continuation-in-part application of my earlier application Ser. No. 282,941 filed Aug. 23, 1972, which application is in turn a continuation-in-part application of Ser. No. 53,794, filed July 10, 1970, applications Ser. Nos. 282,941 and 53,794 having been abandoned.

BACKGROUND OF THE INVENTION

In such institutions as hospitals, medical and other laboratories, in industry, financing houses, wholesalers' offices, warehouses and the like, where computers are used for storage and interpretation of data observed or otherwise compiled, it is customary to use a writing system comprising writing units with keyboards and record forming means, whereby it is possible both to write out information in plain language on the writing units and at the same time, by means of interconnected record forming means, such as a perforator, to effect a simultaneous recording of the data pertinent in coded form on a perforated tape or other record means. The record means can be used for feeding the information into a computer, or, where appropriate, such coded data being generated by the writing units can be connected directly on line with the computer. The information which is to be entered into the writing system has generally been compiled in plain language on a record sheet or other suitable medium for checking purposes, and as a recording medium for entry of the data it is customary to use a card, ledger page or the like, which is specific to the person, order, account etc. concerned. Also, when the relevant data are first recorded, the recording medium is also provided with some corresponding identifying or key data in plain language when being positioned on the platen of the writer unit by itself or in front of the record sheet.

Every time recording in such a writing system is to commence, specific data which identify the card and thus the patient, customer, etc. concerned, have to be keyed-in by the operator of the writer unit, in order that this information may be stored in the computer under the same address and, subsequently, when required, be retrieved under this address. It is, in other words, necessary for the operator to key-in the same identification data anew every time a new set of information compiled on the same card is to be entered into the writing system, in order that the relevant identification data shall be transferred to the record forming means or the computer. Not only is this a laborious process, but it also involves the risk of an address being wrongly recorded because of an error on the part of the keyboard operator. This may have very serious consequences if, for example, diagnostic data are recorded under the address of a patient other then the one to whom it relates.

OBJECTS OF THE INVENTION

It is a primary object of the present invention to provide an improved data identification, information and storage system.

It is another object of the present invention to provide an improved system of the type specified wherein identification and information data may be recorded in both uncoded and coded format.

It is another object of the present invention to provide an improved apparatus for controlling the recordation and temporary storage of identification and information data.

SUMMARY OF THE INVENTION

The present invention achieves the aforementioned results by a combination of the following apparatus. A writer unit, which may be manually or automatically operated, types identification and information data in plain language on individual identification and information recording cards. A first record forming means prepares a coded record form of the data typed by the writer unit. A reader transfers the data recorded on the record means to the first record forming apparatus and/or the writer unit. Specified identification data in coded form is temporarily stored in data storage means, which identification data is generated by the writer unit simultaneously with the typing of that data in plain language on the record cards and simultaneous with the recording operation of the first record forming means. A second record forming means provides a coded record of the coded identification data temporarily stored in the data storage means on a recording medium when that recording medium is placed in the second record forming means subsequent to the receipt of the identification and information data in plain language. Control means controls the data storage means for the transfer of the coded specified identification data from the writer unit and the transfer from the coded identification data from the storage means to the second record forming means, whereby the identification data stored in the storage means is recorded on a specified recorded medium in coded form subsequent to the recordation thereon of the identification and information data in plain language. Such a recording medium having the identification data both in plain language and in coded form is then an identifying card for controlling the writing system when information stored by the writing system under a specified identification code on the specified card is to be entered or withdrawn from the system.

BRIEF DESCRIPTION OF THE DRAWINGS

FIG. 2a is a perspective view of an arrangement showing a physical layout of the various units assembled to form a preferred embodiment of a data identification and information system in accordance with the invention, FIG. 2b is a layout on a larger scale of the control unit showing the various operating pushbuttons, control switches and indicator lamps incorporated in the arrangement in FIG. 2a.

FIGS. 4a and 4b form a detailed logic circuit diagram of the memory unit and the control unit, respectively, and show their association with the writer unit and the second record forming means; and FIG. 4c shows the manner in which FIGS. 4a and 4b should be arranged.

DETAILED DESCRIPTION OF A PREFERRED EMBODIMENT

Figure 1:
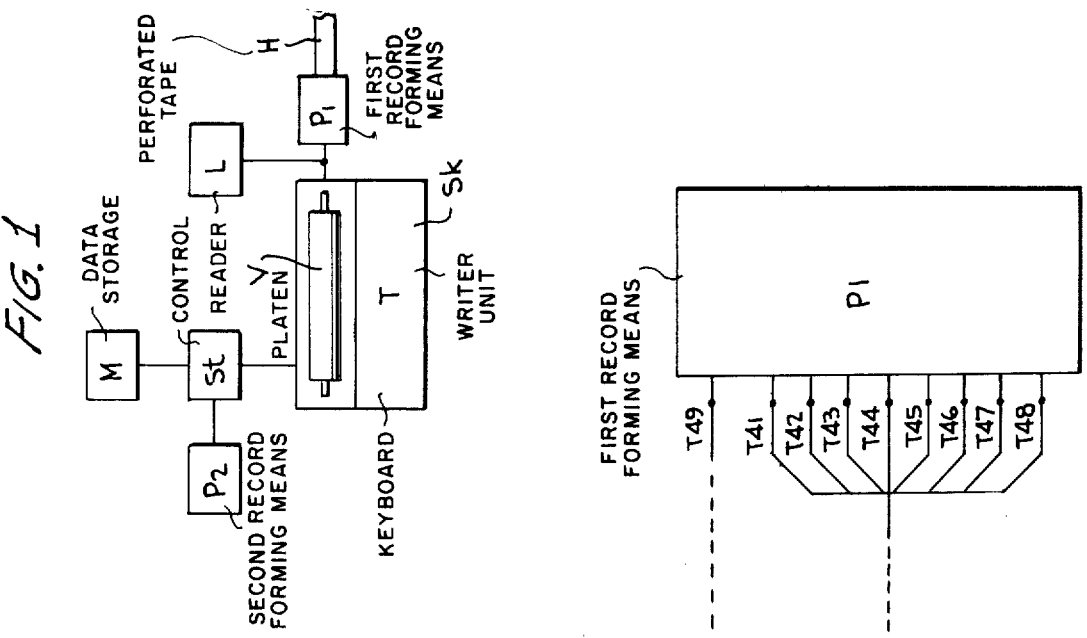
FIG. 1 is a general block diagram showing the interconnections between the various units comprising an apparatus according to the present invention.

The principle of the invention is diagramatically illustrated in FIG. 1. The same shows a manually and automatically operable writer unit S$k$ with a keyboard T and platen V, and with ancillary equipment which, in whole or in part, may be mounted on the printer or be installed separately and adapted for connection to the writer unit.

The ancillary equipment comprises a first record forming means $P_1$, of known principle, which when any of the keys of the keyboard T are struck, receives corresponding data in coded form from the writer unit and records that data on a record medium. The record forming means may constitute, for example, a data processing computer directly connected to the writer unit through interfacing means, or record forming means in the form of a perforator which punches the data in perforation code on a perforated tape H. This tape may then, through another interfacing means, be fed to a data processing computer. The record forming means $P_1$ can be operated not only from the keyboard of the writer unit but also from a reader means L which can reproduce information registered on, for example, control tapes or perforated cards, as is often the case with known writer units, e.g. for tabulating the compiled recordings and for recording fixed data.

For a better understanding of the operation of such a writing system incorporating a manually and automatically operable writer unit, the first record forming means and reader means, reference is made to U.S. Pat. No. 3,353,744. That patent contains a thorough description of how a writer unit comprising an electric typewriter with a type head unit and a platen and also comprising a keyboard and associated controls are interconnected with a record forming means and a record reader means substantially integrally formed with the writer unit.

In addition to this known equipment, the diagram in FIG. 1 also shows a data storage means M which, under the control of a control means S$t$, can receive data which are keyed in on the keyboard of the writer unit and subsequently, when required, relay them to a second record forming means $P_2$. The storage means M (in the following designated as memory unit or memory) is solely intended to store identification data which are printed the first time they are entered on a given card, and, therefore, is only required to have a data storage capacity corresponding to a small number of characters. It is conveniently controlled by the control unit S$t$ so that the feeding of data into it for temporary storage is automatically stopped as soon as a predetermined number of characters have been keyed-in. The memory unit may be of any type, and may, for example comprise magnetic cores or preferably constitute a so-called active memory comprising a plurality of appropriately interconnected bistable elements or shift-registers. When the appropriate number of sets of information has been entered into the memory, this may conveniently be indicated by light signals.

Thus, the first time identification and information data is entered on an identification and recording card, the relevant identification data will enter the memory M at the same time as that data are printed in plain language on the identification card and in coded form punched on the tape H by the first record forming means $p_1$. Data entry into the memory then ceases and the remaining information is typed in plain language to the card and transferred in coded form to the tape by continued striking of the keys on the keyboard T, possibly alternating with fixed data from an endless control tape or other coded medium in the reader L. Before changing to another card, the first card is placed in the second record forming unit $P_2$, which may well be a perforator like $P_1$ and which, when a pushbutton incorporated in the control unit S$t$ is depressed, records onto the card the identification data stored in the memory M.

Then, when another button in the control unit S$t$ is depressed to effect a recording pertaining to other identification data, the information stored in the memory M may either automatically be erased, making the memory ready to receive the new identification data, or preferably the previously stored identification data are shifted upon the entry of new data into the memory.

The identification cards onto which there have been recorded punched identification data in coded form and on which there have been typed identification data and further information in plain language, can then be used as record sheets themselves or be attached to other record sheets on which additional information that is specific to the identification code concerned can be written in plain language, for example by hand.

When a new recording of such new information has to be made from a card which has previously been supplied with identification data both in clear language and subsequently in coded form, the card is first placed in the reader L (after removal of any coded medium that might be there beforehand), from which the relevant coded identification data can then be transferred to the perforator $P_1$ for the recordation by the same onto the tape H before the additional new information is recorded. Simultaneously, the information may, of course, also be written out in plain language on a printing medium, e.g. a record sheet on the platen V of the writer unit S$k$ in the normal manner.

This ensures that information pertaining to the same identification data will always be recorded onto the appropriate record means, or, when the record forming means constitutes an on-line data processing computer, will be fed into the computer under one and the same address.

The identification card is also used when stored information is to be retrieved from a data processing computer, and the identification card ensures that the pertinent stored information is retrieved only when one and the same identification code is identified by the computer. The stored information which has been stored under the specific identification address can be printed out in plain language or on tape, or in tabulated form on a display terminal.

When entering data on the tape from compiled observations noted on cards, it often happens that a number of consecutive cards relate to individuals, accounts, orders, etc. having certain common characteristics, i.e. that entry is effected in groups for different categories, which may then also have the first characters of the identification code in common. For this reason it may be convenient to control the memory M by means of the control unit S$t$ in such a manner as to permit the first character or characters of the identification code, i.e. the common characters, to be "masked off" by using a switch or similar device, so that they are permanently stored in the memory. Thus, when entries are made from cards of the same group, only a reduced number of characters, viz. those which are not common to the entire group, are entered and shifted during the striking of appropriate keys of the keyboard of the writer unit.

This does not, of course, preclude the registration of the complete identification code in coded form onto an identification card which is used for the first time and has been placed in the record forming unit $P_2$ subsequent to the receipt of the identification and information data in plain language.

As indicated above, in the system shown in FIG. 1, the recording means $P_1$ might also be replaced by interfacing means interconnecting the printing and recording arrangement directly on-line with a data processing computer. It would then be unnecessary to record and store the typed or read information on the tape H before the information is fed into the computer.

FIG. 2a shows a physical layout of the various units described in FIG. 1, assembled together to form a preferred embodiment of an apparatus for printing and recording data in a data processing system. The apparatus comprises a manually and automatically operable writer unit S$k$ which, in connection with a specific embodiment in accordance with the present invention, may be of the type marketed under the name Friden 2301 FLEXOWRITER. This type of writer unit S$k$ has integral record forming means which is able to punch tapes and card edges, and a reader means which is able to read the same information punched on the tapes or cards. Such a writing unit is able to perform the same functions as the writing system described in the above mentioned U.S. Pat. No. 3,353,744, although the physical layout of the two systems is somewhat different. However, the Friden 2301 FLEXOWRITER constitutes a preferred writing unit to be used for the present invention; the integral design of the writer unit, the record forming means and the reader means being highly favourable for facilitating the operating procedure. Conveniently, the record forming means will constitute the second perforator $P_2$ previously described, whereas the reader means which is also formed integrally with the writer unit S$k$ constitutes the reader L as indicated on FIG. 1. The previously described first record forming means $P_1$ may in the preferred embodiment shown on FIG. 2a take the form of a separate record forming means or perforator. The record means comprises paper tape H, but can, in a broader aspect of the invention take other forms such as magnetic tapes, discs, etc. The first perforator unit $P_1$ may be of the type marketed under the name Friden 2315 and the details of the operation of this perforator unit are in all substantial respects, similar to the perforator unit disclosed in U.S. Pat. No. 3,353,744. The memory unit M is in accordance with a preferred embodiment of the invention of the shift register type. Such a memory unit is made up of a number of parallelly operating shift registers, that number corresponding to the number of bits which are necessary for appropriately maintaining the alpha-numeric identification data in coded form during the storage operation. If an eight-bit code is chosen, the number of shift registers must be eight, whereas the number of shift or bit positions in each shift register must correspond to the number of characters which constitute the identification data. The control unit S$t$ with its control, switching and indicator means might be built as an integral part of the printer S$k$, conveniently aligned with the keyboard T of the printer. The function of the memory M and the control unit S$t$ in connection with the operation of the apparatus will be described in detail later.

The writer unit S$k$ with its perforater $P_2$ and reader L and the control unit S$t$ are preferably placed on top of a table T$b$, and the memory unit M is placed at any convenient location preferably under the top of the table. In the embodiment shown in FIG. 2 the first perforating unit $P_1$ is also placed at a convenient position under thhe table.

In FIG. 2b, which shows the layout of the control panel for control unit S$t$, PSS is an on-off switch for the power supply to the apparatus. The switch PSS has two positions, the designation 1' indicating the on-position and 0' the off-position. When the power supply to the apparatus is on, an indicator light PSL is illuminated. A selector switch MSS is used for determining how many coded characters or words of the memory are to be used for identification purposes. The selector switch MSS has three positions, designated 0-1-WR' in the drawing. In the upper position (0) of the switch MSS, only six of the eight words or characters are used in the memory M. The two remaining words are then nondestructively stored, and the memory M operates with six words which are stored and punched as described below. In the middle position (1) of the switch MSS, the two extra "words" (or characters) are used and are punched out via the perforator $P_2$ ahead of the other six words as described later. These two words can only be changed when the selectoi switch MSS is in its lower position (WR'), and these words are then changed when the system is in a "write" mode of operation, as explained below. During the "write" mode of operation, an indicator light MWRL is illuminated. When the memory has received all pertinent identification data, the indicator light is extinguished.

At the lower position of the layout of the control unit S$t$, a pushbutton WR is placed. By depressing pushbutton WR, the memory M is set in the "write" mode of operation, whereby the first six (or eight — depending on the position of selector switch MSS) words or characters which are typed on the printer S$k$ are stored in the memory. During this writing operation, the indicator light MWRL is on, and is extinguished when the memory is filled or when the associated number of shifts have been accomplished. Below the indicator light MWRL, another pushbutton PCH is located. Pushbutton PCH activates the perforator $P_2$ of the printer S$k$, but is locked during a storage operation, i.e. when the indicator light MWRL is on.

When the six or eight words or characters have been typed during a storage operation, the system is automatically changed to "non-write" mode of operation, whereupon pushbutton PCH again can be activated. Upon depressing pushbutton PCH the stored information (six or eight words) in the memory M is punched out by the perforator $P_2$ on a card or a tape appropriately placed therein, and the stored information is simultaneously recirculated back to the memory unit M. Thus, the stored information in the memory M can be punched out as many times as desired, and the stored information is only changed when a new storage or "write" operation is carried out.

An identification and record card C is shown in the reader L, and a record sheet RS possibly associated with the card C is shown on the platen V of the printer.

Figure 3:
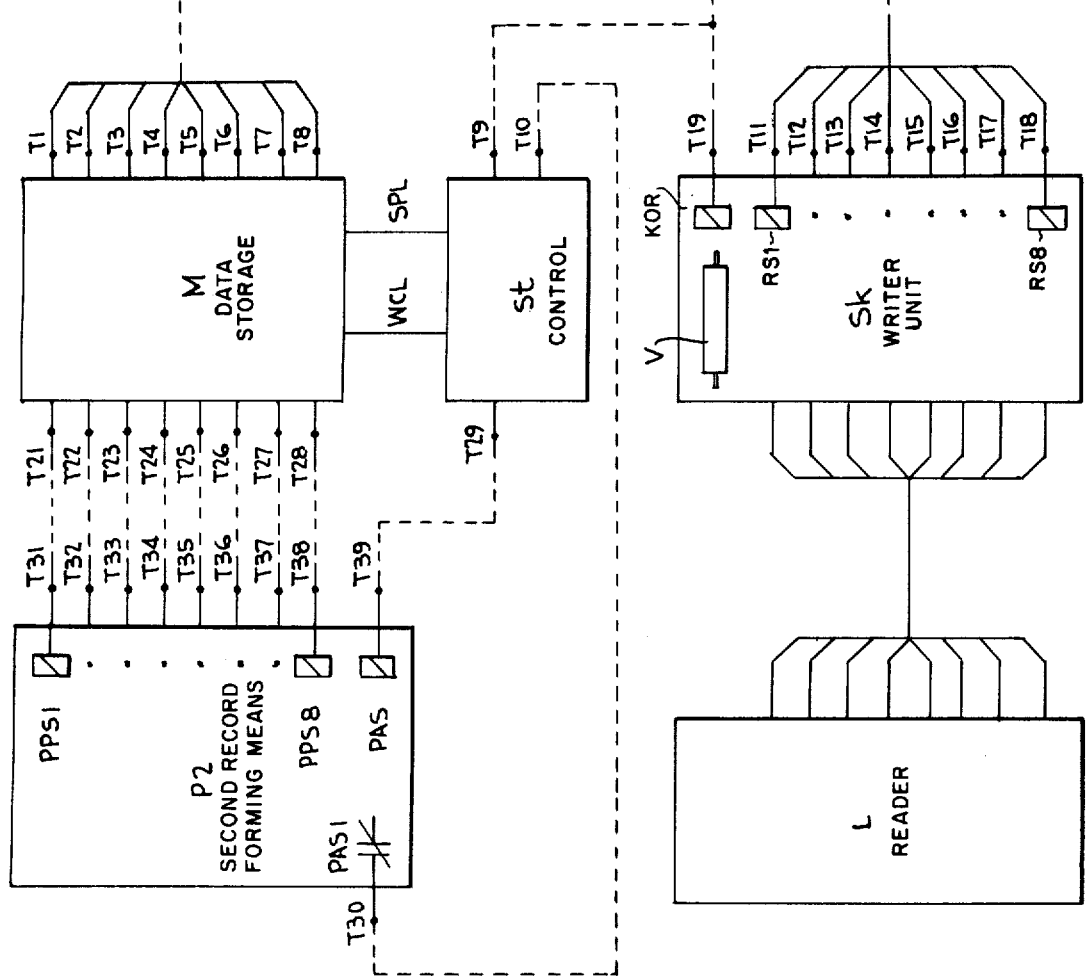
FIG. 3 is a detailed block diagram of the system showing the necessary terminal interconnection between the units embodied in the apparatus of the invention.

FIG. 3 shows a more detailed block diagram of the writing system of the present invention, special reference to the necessary interconnections between the units comprising a preferred embodiment of the invention. The interconnections are to a certain extent repeated in FIGS. 4a and 4b which show the detailed logic circuit diagram of the memory unit M and the control unit S$t$, respectively.

The interconnection between the reader unit L and the writer unit S$k$ is only shown diagrammatically and may in all substantial respects be accomplished as disclosed in U.S. Pat. No. 3,353,744.

Solenoids RS1–RS8 of the writer unit S$k$ are controllably associated with code circuits which are energized in selected patterns according to the writer unit operation, i.e. in dependence upon which key is struck on the keyboard T of the writer unit S$k$. Signals from these relays are generated at output terminals T11–T18 of the writer unit S$k$, terminals T11–T18 being individually connected to respective input terminals T41–T48 of the first perforator P$_1$ and to input terminals T1–T8 of the memory unit M. A keyboard operated relay KOR in the writer unit S$k$ is connected to output terminal T19 of the writer unit S$k$, and a signal appears on this output terminal whenever any character key of the keyboard T of the writer unit S$k$ is depressed. Output terminal T19 is connected to input terminal T49 of the perforator P$_1$ and to input terminal T9 of the control unit S$t$.

An output terminal T29 of the control unit S$t$ is connected to a punch-actuation solenoid PAS of the second perforator P$_2$, the function of which will be explained in detail later. An output terminal T30 of punch P$_2$ which is deenergized and energized in pace with a normally closed contact PAS1 of the punch-actuation solenoid PAS is wired back to an input terminal T10 of the control unit. From the memory unit M output terminals T21–T28, individually connected to the output from separate associated shift registers in the memory unit, are wired to associated input terminals T31–T38 of the second perforator P$_2$, each of terminals T31–T38 being connected to individual perforator punch solenoids PPS1–PPS8 in the perforator P$_2$.

Between the control unit S$t$ and the memory unit M two wires are indicated, namely WCL and SPL. From the control unit S$t$ to the memory unit M these two wires conduct a write/circulate signal and shift pulses, respectively, and the function of these signals will be described in detail with reference to FIGS. 4a and 4b.

Figure 4B:
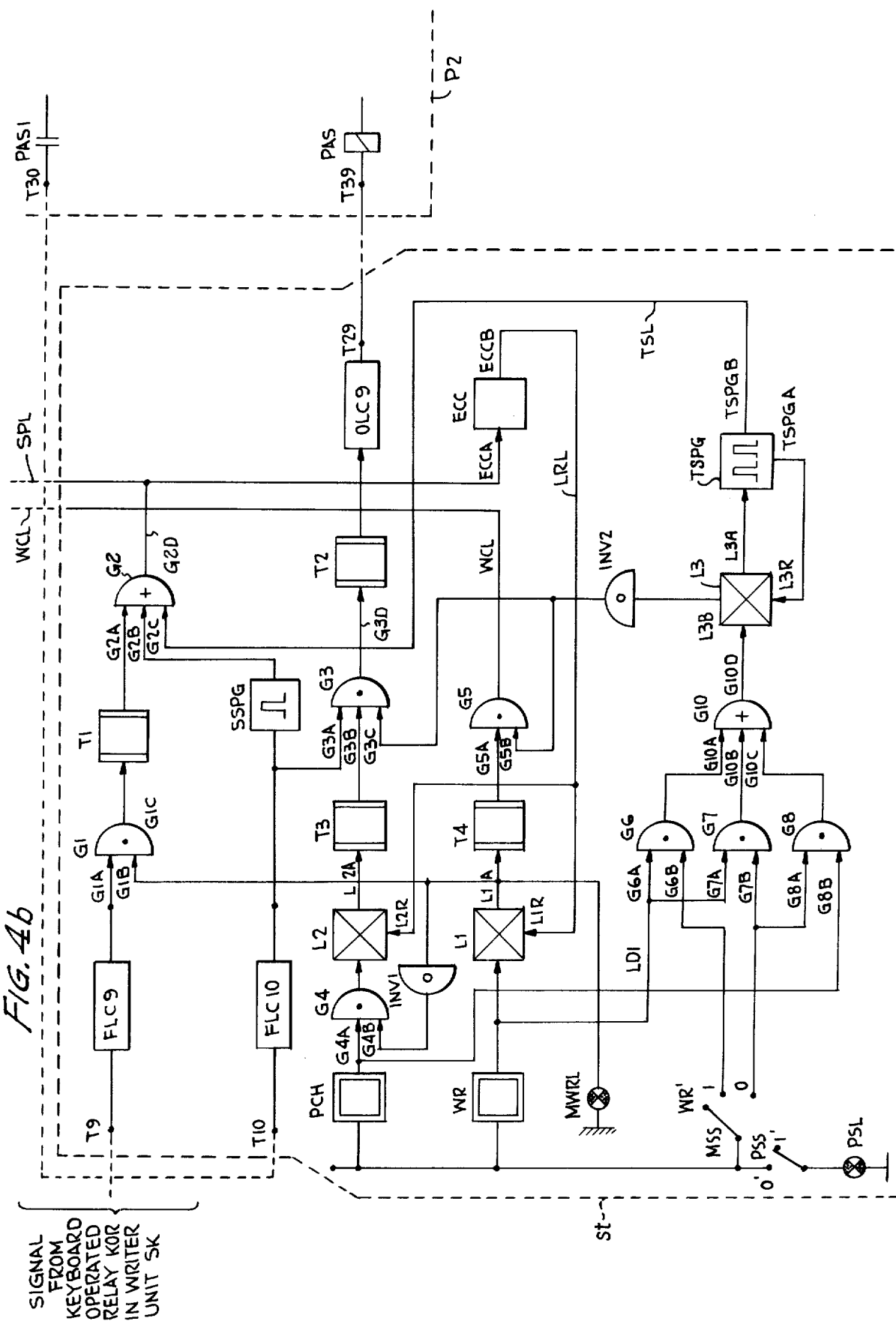

In FIGS. 4a and 4b the different modes of operation which may be accomplished in a writing system according to the invention will be described in detail, with reference also to FIG. 3.

Signals from the writer S$k$ will in coded form appear on the input terminals T1–T8 of the memory unit M when any character key of the keyboard T of the writer S$k$ is struck or depressed. The input signals will be at an individual high or low voltage level depending on the pattern of the selected 8-bit code corresponding to the character represented by the activated key. The voltage levels will normally be either +110 Volts representing the high level or approximately 0 Volts representing low level. In order to avoid any ripple from the 110 Volt signals imposed on the input terminals T1–T8 when entering the memory unit M and to bring the magnitude of the input signals down to a level suitable for adaption to the logic elements in the memory unit M, the input signals will have to pass individual filter and level converter units FLC1–FLC8 before arriving at gate selector units GS1–GS8 which are connected between the input terminals T1–T8 and the shift registers SHR1–SHR8. Thus, the signals initiated by the depression of any character key of the writer unit S$k$ will be presented to the memory unit preferably either as a +5 Volt high level logic signal or a signal approximately 0 Volt representing the low level logic signal. Each of the gate selector units GS1–GS8 have three input terminals, the first input terminal GSA being connected to the output from the associated filter level convertor FLC1–FLC8, the second input terminal GSB being connected to the lead WCL which conducts the write/circulate control signal from the control unit S$t$, and the third input terminal GSC being connected to the output SHRA from the associated shift registers. When a high level signal appears on the lead WCL, the gate selector units GS1–GS8 will enable signals from the keyboard of the writer S$k$ to be advanced into the shift register SHR1–SHR8, the system thus being in the "write" mode of operation. When no signal appears on the input terminals GSB of the gate selector units GS1–GS8 only output signals from the outputs SHRA of the shift registers SHR1–SHR8 will be enabled to reenter or recirculate into the respective shift registers, thus rendering the system in the "punch" or "circulating" mode of operation.

The signals which are allowed to enter the shift registers SHR1–SHR8 are stepped forward or shifted into said shift registers by means of and in synchronism with the shift pulse signals appearing on the shift terminal SHRB of the registers. Shift-pulse signals are generated in accordance with the mode of operation of the system and in conformity with the operation of the control logic as will be explained in further detail below.

The outputs SHRA of the shift registers SHR1–SHR8 are also individually connected to separate output level convertors OLC1–OLC8 which convert the logic signals stored in the shift registers to an appropriate voltage level for the operation of the perforator punch solenoids PPS1–PPS8 of the perforator P$_2$. This voltage level may for instance be +110 volts, but it will only appear on the output terminals T21–T28 in the same selected pattern as the high level logic signals appearing on the outputs SHRA of the shift-registers. As will be further explained later, the perforator punch solenoids PPS1–PPS8 are also interrelated with the punch actuate solenoid PAS, the operation of this being monitored by the logic circuit of the control unit S$t$.

In FIG. 4b the logic circuitry associated with the control unit S$t$ will be discussed in detail. In the upper left corner of the logic circuitry of S$t$, which in FIG. 4b is confined by a dashed line, the terminal input T9 is shown. This terminal T9 is connected to the keyboard operated relay KOR (FIG. 3) which is actuated when any of the keys of the keyboard of the writer S$k$ is depressed. The signals appearing on terminal T9 are of the same magnitude as the coded signals which appear on the above mentioned terminals T1–T8 i.e. either +110 Volts or approximately 0 Volts. Therefore, a filter and level converter unit FLC9 is inserted between the input terminal T9 and the first input terminal G1A of the succeeding logic element which is a logic AND-gate designated G1. The high level signal on terminal T9 is disabled to pass through the AND-gate G1 unless the system is in the "write" mode of operation, i.e. when a logic signal appears on the second input terminal G1B of the AND-gate G1. When the enable condition of the gate G1 is met, a logic signal will appear at the output terminal G1C of the gate G1. This signal will pass through a logic delay element T1 and, after a given time depending on the setting of T1, on to the first input terminal G2A of a NOR-gate G2, the output of which is connected to the shift pulse lead SPL referred to in connection with the description of the shift-registers SHR1–SHR8. In the upper left corner of the dashed block designated S*t* in FIG. 4*b*, another input terminal T10 is shown. This terminal T10 is connected to the normally closed contact PAS1 of the punch actuate solenoid PAS located in the perforator $P_2$. Terminal T10 is via a filter and level convertor FLC10 and a single-shot step pulse generator SSPG, connected to a second input terminal G2B of the NOR-gate G2, and the output from the convertor FLC10, apart from being connected to the generator SSPG, is also connected to the first input terminal G3A of an AND-gate G3. The interconnection between the terminal T10 and the punch actuate solenoid contact PAS1 is so that a high level signal will be maintained at terminal T10 when the punch actuation solenoid PAS is in its deenergized state. Preferably the contact PAS1 of the solenoid PAS is designed as a break-after-make contact. On the other hand, whenever solenoid PAS is energized thus allowing the activation of the perforator punch solenoids PPS–PPSB, the high level signal on terminal T10 will disappear. When solenoid PAS is deenergized the high level signal will reappear on terminal T10 thereby initiating the single-shot step pulse generator SSPG to generate one stepping or shifting pulse. Whether the solenoid PAS should be energized depends on the state of the input signals to the AND-gate G3. This will be explained in further detail in the following description, reference being made to the various operating pushbuttons, control switches and indicator lamps incorporated in the control unit S*t*.

To the left in the block designated S*t* in FIG. 4*b* is shown the on-off switch for the power supply PSS, the power supply indicator lamp PSL, the three-position selector switch MSS, the punch operation pushbutton PCH, the write operation pushbutton WR and the write mode of operation indicator light MWRL.

Various modes of operation of the arrangement in connection with the writer unit S*k*, will now be described in view of the control logic of the control unit S*t* which supervises the interrelation between the writer unit S*k*, the second perforator $P_2$ and the memory unit M. The interrelation between the reader unit L and the writer unit S*k*, the writer S*k* and the first perforator $P_1$ will also be discussed and in this respect reference is also made to FIG. 3 which has been described above.

The first time identification data and other pertinent data associated with the identification data are to be entered on a new identification card, the card is placed on the platen V of the writer unit S*k* (FIG. 2).

In the first instance it is assumed that the identification data should comprise all eight characters, i.e. the selector switch MSS is switched to the WR' position as indicated in FIG. 4*b*. Then pushbutton WR is depressed setting a write mode latch L1 in its latched position, whereby a high level logic signal will appear on the output terminals L1A of the latch L1. This signal will, when inverted through an invertor element INV1, disable the function of the punch pushbutton PCH as the output from the invertor INV1 is connected to one of the input terminals G4B of a punch enable AND-gate G4, the other input terminal G4A of which is connected to the punch pushbutton PCH. The output from the punch enable gate G4 is connected to a punch mode latch L2 the function of which will be explained later. The output terminal L1A of the latch L1 is also wired to the second input terminal G1B of the AND-gate G1, thus enabling a high level signal from the keyboard operated relay KOR appearing on the terminal T9 to pass the gate G1 whenever anyone of the character keys of the keyboard T of the writer unit S*k* is struck. In addition, the output terminal LA1 of the write mode of operation latch L1 is also connected to the first input terminal G5A of a write-enabling AND-gate G5 via a time delay element T4. When the selector switch MSS is in the WR position, a permanent high level signal will be applied to the second input terminal G5B of the gate G5. The output signal from the gate G5 will therefore be passed on to the write/circulate lead WCL thus rendering the input terminals GSB of the shift registers SHR1–SHR8 (FIG. 4*a*) at a high logic level and thereby switching the gate selector units GS1–GS8 to the write mode-enable position.

Finally, the output terminal T1A of the latch unit L1 is connected to the write mode of operation indicator light MWRL, the on-condition of this being met when the latch unit L1 is in its latched position. Resetting of the latch L1 will occur when a signal appears on the latch reset lead LRL which is connected between the latch reset terminal L1R of the latch L1 and the output terminal ECCB of an eight character counter unit ECC, the latter counting the pulses imposed on the shift puls lead SPL which is connected to the input terminal ECCA thereof. The resetting pulse will appear on the latch reset lead LRL every time eight successive shift pulses have been counted by the pulse counter ECC, and the latch reset lead LRL is also connected to the reset terminal L2R of the punch latch unit L2.

From the interconnection between the write pushbutton WR and the latch L1 a lead LD1 is wired to the first input terminal G6A of a first selector gate G6 and the first input terminal G7A of a second selector gate G7, respectively. The second input terminal G6B of the AND-gate G6 is connected to the 1-contact of selector switch MSS, whereas the second input terminal G7B of the AND-gate G7 is connected to the 0-contact of the selector switch MSS. Also connected to the 0-contact of the selector switch MSS is the first input terminal G8A of an AND-gate G8. As none of the AND-gates G6, G7 and G8 are connected to the WR'-contact of the selector switch MSS, it is to be understood that the enabling functions of these gates will be blocked when the selector switch MSS is in the WR' position, and a high level logic signal will only appear on the output terminals thereof when the selector switch MSS is either in the 1 position or in the 0 position. The output from each of the gates G6, G7 and G8 is connected to individual input terminals G10A, G10B and G10C of a NOR-gate G10. The output terminal G10D from gate G10 is connected to a third latch unit L3, a first output L3A of which is connected to a two-step pulse generator TSPG. Inherent in the design of the two step pulse generator TSPG is also a counter which generates a reset signal at a first output terminal TSPGA thereof every time two pulses have been generated by the generator TSPG. The two-step reset pulses appearing on the first output terminal TSPGA of the generator TSPG are conducted to the reset terminal L3R of the latch L3. The two steps generated by the pulse generator TSPG will, via a lead TSL connected to the output terminal TSPGB thereof, appear on the third input terminal G2C of the OR-gate G2, will pass this gate and, consequently, be imposed on the shift pulse lead SPL, thus enabling the shift registers SHR1–SHR8 to perform two shifts, i.e. circulate the information stored in the shift registers SHR–SHR8 by two steps. The two pulses generated by the two-step generator TSPG will only permit recirculation of the stored information, as the output signal which appears on a second output terminal L3B of the latch L3 and which is inverted in an inverter unit INV2 is conducted to the second input terminal G5B of the write/circulate enabling gate G5. It should be noted that this "false" stepping of the shift registers SHR1–SHR8 is only enabled when the selector switch MSS is in the 1 or the 0 position, i.e. when the enabling functions of any of the gates G6, G7 and G8 are met. This will be explained in further detail with the description of the two other positions of the selector switch MSS. Now, when the selector switch MSS is in the WR' position the AND-gates G6, G7, G8, the latch L3 and the two-step pulse generator TSPG will be inoperative, i.e. a permanent low level logic signal will be maintained on the input terminal G2C of the OR-gate G2 and a permanent high level enabling signal will appear on input terminals G3C and G5B of the AND-gates G3 and G5, respectively. Thus, upon depressing the pushbutton WR, the system is enabled to be set in the "write" mode of operation, i.e. the gate selector switches GS1–GS8 of the shift registers SHR1–SHR8 are allowed to be set in the write-enabling position.

When any character key on the keyboard T of the writer S$k$ is then depressed the coded signals appearing on the input terminals T1–T8 of the memory unit M are allowed to be set in the respective shift registers SHR1–SHR8. Simultaneously with the depressing of any character key, a signal will also appear on input terminal T9, that signal advancing through FLC9, G1, T1 and G2, and thus via the lead SPL appearing on input terminals SHRB of the shift registers as a shift signal. The signals which appear on terminal T1–T8 and which represent the logic code of the character struck on the keyboard will then, accordingly, be shifted into the respective shift registers SHR1–SHR8 in pace with the signal on input terminal T9, the logic time delay element T1 ensuring that the appropriate sequencing between the setting and shifting of the shift registers SHR1–SHR8 is maintained.

The stepping or shifting signal appearing on the output terminal G2D of the OR-gate G2 is simultaneously registered by the eight character counter ECC, the latter generating a latch reset signal upon the latch reset lead LRL when eight steps or shifts have been performed, i.e. when eight identification characters in coded form have been entered into the shift registers SHR1–SHR8. When signals are shifted in the shift registers, the signals which previously were stored in the shift registers will consequently appear on the output terminals SHRA of the shift registers. These signals will pass the output level convertors OCL1–OCL8 and will be imposed on the perforator punch solenoids PPS1–PPS8, but as the punch actuate solenoid PAS of the perforator P$_2$ is not energized, the operation of solenoids PPS1–PPS8 is inhibited.

However, as the terminals T1–T8 of the memory unit M are wired from the output terminals T11–T18 of the writer unit S$k$ and the latter is also connected to the first perforator unit P$_1$ (FIGS. 1 and 2), the coded identification signals will simultaneously, while being passed on to the shift registers SHR1–SHR8 of the memory unit M, be passed on to the first record forming means P$_1$, thereby storing the same identification data on an appropriate record means, e.g. paper tapes. Such a record means may, of course, also take other forms such as magnetic tapes, discs, etc., or, if desired, this record forming means may be a data processing machine connected on-line with the writer unit in the same manner as the perforator P$_1$, possibly via an interface unit. As earlier described, the relevant identification data struck on the keyboard T of the writer unit S$k$ are also typed in plain language on the card placed on the platen V of the writer unit S$k$. Thus, when the system is in the write mode of operation and when the selector switch MSS is in the WR' position, the first eight characters struck on the keyboard will enter in coded form into the memory unit M. Then, after the eight characters have entered the shift registers SHR1–SHR8 of the memory unit M, and as the advanced shifting of the data is accommodated by means of eight shift pulses on the shift pulse lead SPL, the latter pulses also being registered by the eight character counter ECC, resetting of the write latch unit L1 will occur. When resetting of L1 takes place, the light in the indicator lamp MWRL extinguishes, and the keyboard operated relay KOR is disabled so as not to generate any further stepping pulses as the gate G1 is blocked due to a low level logic signal appearing on terminal G1B thereof in response to the resetting of the latch L1. Resetting of the write latch unit L1 also resets the gate selector units GS1–GS8 of the shift registers SHR1–SHR8 to the circulate mode of operation due to the blocking of the gate G5, and the resetting of L1 also cancels the disable condition of gate G4 which now may be enabled to perform initiation of the punch mode of operation, as will be explained below.

Further information data struck on the keyboard T of the writer unit S$k$ are thus, unless the write pushbutton WR is depressed once more, not allowed to enter the shift register, but the additional data may, of course, still be transferred in plain language to the card on the platen and/or to the first record forming means P1. Besides, further information data read by the reader may still be registered on the card in plain language, simultaneously with being transferred to the record means H of the record forming means P$_1$. But as mentioned above, the transfer of information to the memory unit M ceased when the apparatus changed to the non-write mode of operation, i.e. by the resetting of the write latch unit L1.

After the identification data has been entered upon the identification card C in plain language simultaneously with the transfer of that data for temporary storage in coded form to the memory unit M, and when any further information data have been entered upon the card, the identification card is removed from the platen V of the writer S$k$ and placed in the second recording means, i.e. the punch unit P$_2$.

Then, when the punch pushbutton PCH is depressed latching of the punch latching unit L2 will occur. A signal from the output terminal L2A of the latch L2 will then be imposed on the second input terminal G3B of the AND-gate G3. The two remaining input terminals G3A and G3C of the gate G3 will also have a high level logic signal, the input terminal G3A of gate G3 receiving a standby high level signal via the input terminal T10, and the input terminal G3C being at high voltage logic level as the two step latch unit L3 is maintained in the reset condition due to the WR' position of the selector switch MSS as explained above. A signal from the output terminal G3D of gate G3 will, accordingly, via a time delay unit T2 and an output level convertor OLC9 will be transmitted to the punch actuation solenoid PAS, the latter enabling the perforator punch solenoids PPS1–PPS8 to be activated in accordance with the coded information appearing on the output terminals SHRA of the shift registers or at the terminals T21–T28 of the output level converters OLC1–OLC8 which are series-connected to the shift registers.

When the punch actuation solenoid PAS is energized, contact PAS1 thereof will open and the high level logic signal on terminal T30 of the punch $P_2$ will change to a low level signal. This change of signal will respond back to the input terminal T10 of the control unit St, thus bringing the signal on input terminal G3A of gate G3 to a low level, thereby disabling the latter to pass any high level signal to the punch actuation solenoid PAS which, accordingly is deenergized. Deenergization of the solenoid PAS will in turn reclose contact PAS1 and the high level signal on terminal 10 will be regained, thereby reestablishing the enabling condition of gate G3. The raising of the signal on terminal T10 to a high level also initiates a single shot shift pulse to be generated by the single shot pulse generator SSPG, the generated shift pulse being imposed on the shift pulse lead SPL wired to the shift register shift terminals SHRB and to the eight character counter ECC. The shift pulse allows the information in the shift registers to be shifted one step, and as the gate selectors GS1–GS8 of the shift registers are in the circulate mode of operation the information stored in the last positions of the shift registers are recirculated back to the first positions of the respective shift registers and the next set of coded information are now available at the output terminals SHRA of the shift registers. The first shift pulse on the shift pulse lead SPL is also registered by the counter ECC. The output from gate G3 is given an appropriate delay by means of the delay unit T2 to ensure that the first shift of the identification information in the shift registers have taken place and that the second set of coded information stored in the shift registers are available at the output terminals T21–T28 of the memory unit M before the punch actuate solenoid PAS is again energized. Thus, when the solenoid PAS is actuated for the second time the same sequence of events will occur, i.e. the perforator punch solenoids PPS1–PPS8 will punch the stored information corresponding to the second character struck on the keyboard when the system was in the write mode of operation. The energization of solenoid PAS will again entail the opening of contact PAS1 thus reducing the voltage on terminal T10 to approximately zero and disabling the AND-gate G3 to pass a signal via the delay element T2 to the punch actuation solenoid PAS. Re-initiation of the single-shot step pulse generator SSPG to generate a stepping or shifting pulse will occur when the solenoid PAS is deenergized and also the enabling condition of gate G3 will then be re-established. After the second shift or circulation has taken place PAS will, after an appropriate time delay corresponding to the setting of the time delay element T2, again be energized, thus enabling solenoids PPS1–PPS8 to be activated to punch onto the card in the perforator $P_2$ the identification data corresponding to the third character information struck on the keyboard T of the writer unit Sk.

This sequence of events will occur eight times. When all the eight characters stored in coded form in the shift registers have been shifted and recirculated, i.e. when eight shift pulses have been generated sequentially by the single, shot generator SSPG, the eight character counter ECC generates a reset pulse on the latch reset lead LR1 thereby resetting the punch latch unit L2. This will disable the AND-gate G3 to pass any further signals on to the punch-actuation solenoid PAS. The delay unit T2 will ensure that the output will be delayed for a time interval which is longer than the time required for one shift pulse to be generated by the generator SSPG and registered by the counter EEC together with the time required to generate a latch reset signal by the counter ECC. That reset signal resets the latch L2 and thus disables the AND-gate G3 to maintain a high level output at terminal G3D for the purpose of energizing the solenoid PAS even if the timing of the delay element T2 was initiated beforehand. The function of the time delay element T2 is designed so as to give a delayed output signal only when a standby input signal is present, whereas when the input signal drops to approximately zero, the output of the element T2 will immediately obtain the same low level value.

All eight sets of identification data corresponding to the eight characters struck on the keyboard have now been punched onto the card placed in the perforator $P_2$. As the identification data simultaneously with the operation have been recirculated back into the shift registers, the same punching operation will occur when the punch pushbutton PCH is pressed again. This may be of interest when more than one identification card are required, each of which is to be provided with the same idenfication data in coded form.

When another identification card requiring another idenfication code is placed on the platen V of the writer unit Sk, pushbutton WR is again pressed, and another set of identification data are entered into the shift registers, the entering of data thereinto being accomplished as a replacement for the identification data previously stored rather than a circulation thereof as the selector gates GS1–GS8 are in the write mode position.

Very often two or more of the first identification characters entered upon successive identification cards are eaual. In order to save the operator retyping the same identification characters each time such a batch of identification cards are to be coded, the selector switch MSS can be set in the 1 position in which two or more of the eight characters previously entered into and stored in the shift registers are non-destructively stored.

When the selector switch MSS is in the 1 position, the input terminal G6B of the AND-gate G6 will be at a high voltage level, and when the write pushbutton WR is depressed, a signal from that push-button will enable gate G6 to forward a signal to the input terminal G10A of the OR-gate G10, the latter thereby enabling a signal to be passed to the latch unit L3 which is latched. As described earlier, the latching of the latching unit L3 will initiate the two-step pulse generator TSPG to generate two shift pulses which, via the NOR-gate G2, will be imposed on the shift pulse lead SPL, thereby enabling circulation of the two first sets of identification data stored in the shift registers SHR1–SHR8. Simultaneously, the two shift pulses appearing on the shift pulse lead SPL will be counted by the eight character counter ECC. An inverted signal from the latch unit L3, i.e. a signal appearing on the output terminal of the invertor INV2, disables the gate G5 to allow the output signal from the write latching unit L1 to set the gate selector switches GS1–GS8 of the memory unit M in the write mode of operation; thus ensuring that a recirculation of the two first characters definitely takes place, this artificial recirculation actually being the non-destructive storage function of the system. Thus, as recirculation of the two first sets of identification data takes place immediately upon depressing pushbutton WR when the selector switch MSS is in the 1 position, only six further steps have to be performed before the counter ECC initiates a reset signal. After two step pulses have been generated by the pulse generator TSPG the latching unit L3 is reset. A high level logic signal will then appear on the second input terminal G5B of the AND-gate G5, thus enabling the latter to pass a signal to the gates GS1–GS8 to put the shift registers in the write or shift only mode of operation. Six characters can now be struck on the keyboard T of the writer unit S$k$ and the corresponding sets of coded identification data representing the characters will be entered into the shift registers in the same manner as described above. Resetting of the write latch unit L1 will occur when a total of eight shift pulses have been connected by the counter ECC, the first two-of the pulses being generated by the two step generator TSPG and the remaining six by the keyboard operated relay KOR, the signal from which appears on the output terminal T19 of the writer unit S$k$ and on the associated input terminal T9 of the control unit.

After the six characters have been struck on the keyboard further information data is not allowed to be entered into the memory unit before the pushbutton WR is again depressed.

When retrieval of the stored identification data in the memory unit M is called upon, i.e. when the punch pushbutton PCH is depressed, all eight sets of coded information will be punched out by the perforator P$_2$ in the same manner as described above when the selector switch MSS was in the WR' position. When pushbutton PCH is depressed again, the same eight sets of coded information will once more be recorded onto the edge of a given card when this has been placed in an appropriate position in the perforator P$_2$.

Finally, the modes of operation which may be performed when selector switch MSS is in the 0 position will now be described in detail. When the selector switch is in the 0 position only six sets of coded information are allowed to enter the shift registers of the memory unit M. This means that the remaining two positions in the shift registers will be jumped or given an idle circulation. This function is accommodated by means of the initiation of the two-step pulse generators TSPG which will generate two shift pulses for the recirculation of two sets of information prior to the establishment of the "write" mode position of the selector gates GS1–GS8 initiated by the depression of pushbutton WR.

As will be seen in FIG. 4$b$, when selector switch MSS is in the 0 position and pushbutton WR is depressed, input terminal G7A and G7B of the AND-gate G7 will both be at a high logic level, thus enabling the gate G7 to pass a signal to the OR-gate G10, the output signal of which will set the latch unit L3. The same two step sequence as already explained with reference to the write mode of operation when selector switch MSS was in the 1 position will hence occur, and after this sequence is terminated the actual write mode of operation initiated by the depressing of pushbutton WR is established. However, since two step pulses have already been registered by the counter EEC, only six characters in coded form will be allowed to enter the memory unit before resetting of the write latching unit L1 will occur.

When retrieval of the stored six sets of identification data is called upon, the punch pushbutton PCH is depressed. A high level logic signal from the pushbutton PCH will then be passed to the second input terminal G8B of the AND-gate G8, the first input terminal G8A of which is already at a high logic level due to the 0 position of the selector switch MSS. Thus, the depression of the pushbutton PCH will enable gate G8 to impose a high level signal on the input terminal G10C of the OR-gate G10, the output of which will initiate the setting of the latching unit L3. Latching of L3 will then initiate the two step shifting sequences of the shift registers SHR1–SHR8 by the generation of two-shift pulses in the two step pulse generator TSPG. During these two stepping or shifting sequences, i.e. in the latched condition of the latching unit L3, the punch enabling gate G3 will be blocked. As mentioned earlier this blocking is due to the output signal from the latching unit L3 which is inverted by the invertor INV2 and which will keep the input terminal G3C of the AND-gate G3 at a low logic level. However, when the two step sequence performed by the step generator is accomplished and the two first coded characters stored in the memory unit have been recirculated, latching unit L3 is reset. All input terminals of the AND-gate G3 will then be at a high logic level thus enabling gate G3 to forward a signal to the punch actuation solenoid PAS so that the six remaining, or not jumped coded characters in the memory unit, can be punched out by the subsequent energization of the perforator punch solenoids PPS1–PPS8 of the perforator P$_2$ in the same way as explained above in connection with the retrieval of all eight coded characters. That is, when the selector switch MSS was in the WR' or the 1 position. The two-pulses generated by the two step pulse generator TSPG prior to the retrieval punching are registered by the eight character counter ECC in advance of the actual punching operation, so that when the retrieval punching commences only six consecutive punching or retrieving operations will be allowed. These six latter operations will be registered by the eight character counter in addition to the two primary step functions, the eight character counter ECC resetting the punch mode of operation when a total of eight stepping or shifting functions have been accomplished.

As will be understood various modifications of the memory unit and the control unit may be accomplished without transgressing the scope of the invention. Thus, the number of sets of identification data which can be stored in the memory unit M may easily be altered. If it is desired to increase the capacity of the memory M for storing more than eight characters in coded form, additional shift register positions or cells have to be added to the individual shift registers. When the number of storage locations is increased the character counter must also be changed to register a higher number of shift pulses before a reset signal is generated. Also the number of sets of identification data to be non-destructively stored or jumped, may readily be changed by changing the number of pulses generated by the two-step pulse generator TSPG.

The following is a description of an operating procedure in connection with the preferred apparatus described above, will be given in the following.

The first time identification data and other information are to be entered on a new identification card, the card is placed on the platen V of the control unit S*t*. Depending on whether the identification data comprises six or eight new characters, the selector switch MSS is switched to one of its three position (0–1—WR'). Then pushbutton WR is depressed, setting the apparatus in the write mode of operation which is indicated by the excitation of indicator light MWRL. The relevant identification is then struck on the keyboard T of the writer unit S*k* so as to be typed in plain language on the card and at the same time the six or eight words or characters which make up the identification data are entered into the memory unit M in coded form. The identification data are also, in coded form, simultaneously punched out on the tape H by the perforator $P_1$ which is connected to the writer unit S*k*.

When the first six or eight characters struck on the keyboard, and which constitute the relevant identification data, have been entered in coded form into the memory unit M, the indicator light MWRL is extinguished indicating that the appropriate number of locations in the memory unit M have been shifted. Input to the memory then ceases, and the apparatus automatically changes to non-storage mode of operation. Further information data which are typed on the keyboard T or read by the reader L are transferred to the tape H of the perforator $P_1$, and/or printed out in plain language on the card or another record sheet associated with the identification card, which might be placed on the platen V of the writer unit S*k*, while the idenfication data remain stored in the memory M.

Before changing to another identification card, the first identification card is placed in the punch unit $P_2$. Pushbutton PCH is then depressed, and the identification data stored in the memory M are punched out in coded form on the identification card. The identification data are simultaneously recorded onto the first identification card and recirculated back into the memory and the same recirculation and recordation operation is repeated by again depressing pushbutton PCH. This might be desirable if, for example, several identification cards are required, each of which is to be supplied with the same coded identification data.

When another new identification card is placed on the platen V of the writer unit S*k*, selector switch MSS remains in its position or is switched to another of its three positions. Pushbutton WR is then depressed and indicator light MWRL comes on. Then, when the identification data are typed on the card, the previously stored information in the memory is replaced by the new identification data. The remaining operating procedure can then be carried out as described above.

The identification cards onto which there have been recorded, i.e. punched identification data in coded form and on which thhere have been typed identification data and further information in plain language, can then be used as record sheets themselves or be attached to other record sheets on which additional information that is specific to the identification code concerned can be written in plain language, for example by hand.

When such new information that has been noted on a coded identification card or its associated record sheets, is to be entered onto the tape H by the perforator $P_1$, the identification card is first placed in the reader L. From the reader L, the coded identification data is transferred to the perforator $P_1$ for recording on the tape H, before the additional information on the card is punched out by operating the keyboard T of the writer unit S*k*. Simultaneously, the information may, if desired, also be written out in plain language on a separate record sheet on the platen V.

The coded identification on the card ensures that information related to the same identification data will always be punched on the tape H and fed to any data processing computer by the tape H under one and the same address.

If, as previously described, the perforator $P_1$ is replaced by an on-line interface unit, the coded identification data on the card can be transferred directly to a computer, and the information relating to the coded identification data will also be fed directly into the computer. The coded identification data will then in a similar manner ensure that the information is fed into and stored in the data processing computer under one and the same address. For a retrieval operation, the coded identification card is likewise placed in the reader L and will thus ensure that the pertinent stored data in the computer are retrieved only when the coded identification data are identified by the computer.

The main advantage of the apparatus according to the present invention is that it eliminates the necessity of repeating an identification code once it has been recorded by the system. This aids in avoiding transcription errors which may result in information data being associated with the wrong identification code. Moreover, the identification code can be used as an addressing code either during an information recording or a retrieving operation.

If the memory is connected only to one keyboard printer as assumed above, it will constitute a relatively inexpensive ancillary apparatus. However, also in institutions with many keyboarding points it will suffice to have a single, central memory which is common to some or all keyboarding points and which can be operated from these as required, and especially in such a case it may be practical to integrate it in the computer itself.

As the card is to be used for repeated entry of the identification code via the reader L into the perforator $P_1$, the code should be located at a place on the card where it is exposed to as little risk of damage from wear and tear as possible, e.g. along one edge or on a separate tag or strip permanently affixed to the actual card on which the text is written out.

The card may, for example, be a patient's record card, a customer card or an account card, but it may also be a question of printing media that are not ordinarily referred to as cards, e.g. sheets of paper, loose leaves, record sheets, and so on. The main thing is that the medium in question is suitable for making notes on, or for writing on in plain language, and that it is specific to the identification code concerned, i.e. to the associated patient, client, order, etc. and is suited for cooperating functionally with the recording unit $P_2$ and the reader L.

What is claimed is:

1. In a data identification and information system having a writer unit with first input and output means and second input and output means, said first input and output means enabling the printing of plain language alpha/numeric data on at least one recording medium within said writer unit in response to signals from said writer unit or external data signals, said second input and output means generating coded output signals in response to said writer unit or external data signals, first record forming means responsive to said coded output signals for duplicating in coded form said plain language alpha/numeric data printed by said writer unit, reader means selectively connected to said first input and output means or said second input and output means to actuate said writer unit to print plain language alpha/numeric data in accordance with coded recorded information stored on a recording medium read by said reader means, said reader means actuating said first record forming means for duplication of coded information on the recording medium within said reader means, second record forming means for recording coded data input signals, the improvement comprising:

data storage means for temporarily storing said coded signals representative of specified identification data printed by said writer unit from said second input and output means during a storage operation mode and being unresponsive to said coded signals during a non-storage operation mode;

said second record forming means recording said coded signals stored in said data storage means onto said at least one recording medium containing the plain language alpha/numeric data previously printed thereon by said writer unit; and control means for transferring said coded signals from said second input and output means to said storage means and for transferring said coded signals from said storage means to said second record forming means.

2. Apparatus as in claim 1, wherein said data storage means comprises:

a plurality of shift registers for receiving coded identification data from said second input and output means and adapted to recirculate stored identification data simultaneously with the transfer of said data to said second record forming means;

a plurality of first converter means for filtering and changing the logic level of said coded identification data from said second input and output means to said shift registers;

second converter means for changing the logic level of said data from said shift registers to said second record forming means; and a plurality of gate selector units each being connected between a respective one of said first converter means and a respective one of said shift registers; and wherein said control means controls said gate selector units to transfer data from said second input and output means and for recirculating said stored identification data between said shift registers.

3. Apparatus as in claim 2 wherein each of said gate selector units includes three input terminals and each of said shift registers includes a common shift pulse lead connected to said control means, said control means generating shift pulse signals for shifting said coded identification signals stored in said shift registers, said first input terminal of each said gate selector unit being connected to the output of its associated first converter means, said second input terminal of each said gate selector unit being connected to a common control lead of said control means, and said third input terminal of each of said gate selector units being connected to the output of its associated shift register, said control means actuating each of said gate selector units via said common control lead to enable successive coded signals from said second input and output means to be transferred into said shift registers, said non-storage mode of said data storage means being established by the absence of signals on said common control lead preventing coded signals from being stored in said shift registers from said second input and output means, and initiating recirculation of said stored data within said shift registers and simultaneously enabling transfer of said stored signals from said shift registers to said second record forming means.

4. Apparatus as in claim 3 wherein said control means includes a counter for counting the number of shift pulses and generating a signal when the number of pulses counted corresponds to the number of bits in said shift registers, said signal terminating storage of said coded signals in said shift registers, said control means further including selector means settable to a desired number of new sets of coded signals stored in said shift registers.

5. Apparatus as in claim 4 wherein said control means further includes pulse generating means for the generation of a number of pulses corresponding to the difference between said predetermined number setting of said selector means and the number of bit positions available in said shift registers, said predetermined number of pulses altering the unoccupied bit positions within said shift registers whereby only the remaining sets of coded signals are recirculated with simultaneous transfer of stored signal from said shift registers to said second record forming means.

6. Apparatus as in claim 5 wherein said control means further includes gating and latching means interconnected with said counter and said pulse generator means for inhibiting the activation of said second record forming means during the recirculation of idle bit positions in said shift registers.

7. Apparatus as in claim 6 wherein said gating and latching means controls said shift registers to recirculate previously stored coded signals prior to the entry of new coded signals from said second input and output means and for enabling the simultaneous recirculation of coded signals within said shift registers and the transfer of coded signals from said shift registers to said second record forming means.

* * * * *